(12) United States Patent
El-Hibri et al.

(10) Patent No.: US 8,802,772 B2
(45) Date of Patent: Aug. 12, 2014

(54) USE OF POLY(BIPHENYL ETHER SULFONE)S

(75) Inventors: Mohammad Jamal El-Hibri, Atlanta, GA (US); Shari Weinberg, Atlanta, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 0 days.

(21) Appl. No.: 13/365,382

(22) Filed: Feb. 3, 2012

(65) Prior Publication Data

US 2012/0208944 A1 Aug. 16, 2012

Related U.S. Application Data

(63) Continuation of application No. 12/158,508, filed as application No. PCT/EP2006/070145 on Dec. 22, 2006, now abandoned.

(60) Provisional application No. 60/752,922, filed on Dec. 23, 2005, provisional application No. 60/752,951, filed on Dec. 23, 2005.

(51) Int. Cl.
*C08L 81/06* (2006.01)

(52) U.S. Cl.
USPC .......................................................... 524/609

(58) Field of Classification Search
CPC ................................. C08L 81/06; C08L 71/10
USPC .......................... 524/420, 542, 494, 471, 609
See application file for complete search history.

(56) References Cited

U.S. PATENT DOCUMENTS

| | | |
|---|---|---|
| 3,634,355 A | 1/1972 | Barr et al. |
| 4,008,203 A | 2/1977 | Jones |
| 4,108,837 A | 8/1978 | Johnson et al. |
| 4,175,175 A | 11/1979 | Johnson et al. |
| 4,176,222 A | 11/1979 | Cinderey et al. |
| 4,713,426 A * | 12/1987 | Harris et al. ................... 525/471 |
| 4,804,697 A | 2/1989 | Saito et al. |
| 4,804,724 A | 2/1989 | Harris et al. |
| 4,957,962 A | 9/1990 | Winkler et al. |
| 5,852,139 A | 12/1998 | Scheckenbach |

(Continued)

FOREIGN PATENT DOCUMENTS

| | | |
|---|---|---|
| CA | 847963 | 7/1970 |
| DE | 19513403 | 10/1996 |

(Continued)

OTHER PUBLICATIONS

PCT International Search Report dated Mar. 27, 2007, for International Patent Application No. PCT/EP2006/070145.

PCT International Preliminary Report on Patentability dated Jun. 24, 2008, including the Written Opinion from ISA, for International Patent Application No. PCT/EP2006/070145.

(Continued)

*Primary Examiner* — Ling Choi
*Assistant Examiner* — Lanee Reuther
(74) *Attorney, Agent, or Firm* — Oblon, Spivak, McClelland, Maier & Neustadt, L.L.P.

(57) ABSTRACT

A method for reducing the concentration of poly(aryl ether ketone) in an original polymer composition that is exposed to an aggressive chemical environment that is more aggressive against poly(biphenyl ether sulfone) than it is against the poly(aryl ether ketone) while maintaining or exceeding at least one of the original polymer composition's tensile strength, tensile modulus, flexural strength and flexural modulus retention ratio after exposure to the aggressive chemical environment.

22 Claims, 3 Drawing Sheets

(56) References Cited

U.S. PATENT DOCUMENTS

| | | | |
|---|---|---|---|
| 5,916,958 A * | 6/1999 | Kelly et al. | 524/497 |
| 2003/0130476 A1 | 7/2003 | Kemmish et al. | |
| 2009/0048379 A1* | 2/2009 | Weinberg et al. | 524/420 |

FOREIGN PATENT DOCUMENTS

| | | | |
|---|---|---|---|
| EP | 0176989 | 4/1986 | |
| EP | 0212805 | 3/1987 | |
| EP | 0212805 A2 * | 3/1987 | C08L 71/00 |
| EP | 0224236 | 6/1987 | |

OTHER PUBLICATIONS

Paul, D.R. et al., Extract from "Polymer Blends—Immiscible Blends" in Encyclopedia of Polymer Science and Engineering, Wiley—Interscience, New York, Second Edition, J.I. Kroschwitz (Ed.), 1988, vol. 12, pp. 426-430.

Horak, Z., et al., Section 5. Physical Properties of Polymer Blends, extract from "Polymer Blends", in Encyclopedia of Polymer Science and Technology, John Wiley & Sons, Inc.,—Article online posting date Apr. 15, 2005—accessed online on Aug. 11, 2005 via http://www.mrw.interscience.wiley.com/epst/articles/pst276/frame.html.

\* cited by examiner

USE OF POLY(BIPHENYL ETHER SULFONE)S

CROSS-REFERENCE TO RELATED APPLICATIONS

This application is a Continuation of U.S. application Ser. No. 12/158,508, filed Oct. 7, 2008 now abandoned; which is a 371 of PCT/EP2006/070145, filed Dec. 22, 2006; and claims the benefit of U.S. application Ser. Nos. 60/752,922 and 60/752,951, both filed Dec. 23, 2005, the entirety of which is herein incorporated by reference.

FIELD OF THE INVENTION

The present invention relates to a new use of poly(biphenyl ether sulfone)s.

BACKGROUND OF THE INVENTION

Poly(biphenyl ether sulfone)s form a specific class of poly (aryl ether sulfone)s. These amorphous technopolymers are materials of choice notably for the ultimate in toughness with rather good chemical resistance, superior to most of commercially available transparent resins but lower than that of ultra-performance polymers like poly(aryl ether ketone)s.

Precisely, poly(aryl ether ketone)s offer an exceptional balance of technical properties, namely high melting point, excellent thermal stability, high stiffness and strength, good toughness and really excellent chemical resistance, including excellent resistance to environmental stress rupture resistance. However, the somewhat low glass transition of these materials limits theirs use in certain specific applications where the use temperature is above 170° C.: this is primarily because of the loss of modulus as the glass transition is traversed.

In lots of applications, the exceptional balance of technical properties offered by poly(aryl ether ketone)s is plainly appreciated and in said applications, there is e.g. no need for a material that would have improved load bearing capabilities above the $T_g$ of neat poly(aryl ether ketone). An important problem remains still, due to the high cost of the poly(aryl ether ketone)s, which prevents the skilled person from using said poly(aryl ether ketone)s as widely as technically desirable for the encompassed applications, in particular when the shaped articles or at least some part(s) thereof are contacted, temporarily or permanently, with an aggressive chemical environment, and, more particularly when the shaped articles or at least one or more parts thereof are in addition submitted, temporarily or permanently, to stress.

There remains thus a strong need for a polymer composition with a lower cost than that of poly(aryl ether ketone) compositions, but a chemical resistance at least substantially the same as the one obtained by said poly(aryl ether ketone) compositions.

The challenge appeared tricky for the Applicant, especially in view of the teachings of U.S. Pat. No. 4,804,724, as commented below.

U.S. Pat. No. 4,804,724, the whole content of which is herein incorporated by reference, describes blends comprising a poly(biphenyl ether sulfone) and a poly(aryl ether ketone). Per U.S. '724, these blends, at intermediate compositions (such as 50 parts of PPSU and 50 parts of PEEK), exhibit an "interesting" balance of properties, in particular an intermediate toughness and modulus (thus intermediate load bearing capabilities) in the range between the (low) poly(aryl ether ketone) $T_g$ and the (high) poly(biphenyl ether sulfone) $T_g$, and an intermediate chemical resistance (including an intermediate environmental stress rupture resistance) in certain chemical environments (ethyl acetate, 1,1,1-trichloroethane, toluene and acetone) in the range between the (high) chemical resistance of the poly(aryl ether ketone) and the (substantially lower) chemical resistance of the poly(biphenyl ether sulfone). Thus, the teachings of U.S. '724 are two-fold: (1) poly(biphenyl ether sulfone)s can be used for increasing the load bearing capabilities above the $T_g$ of neat poly(aryl ether ketone)s, and (2) adding a poly(biphenyl ether sulfone) to a poly(aryl ether ketone) is expected to cause a substantial decrease of the chemical resistance.

Thus, in short, the skilled in the art, in view of the teachings of U.S. '724, would have understood that replacing part of the poly(aryl ether ketone) contained in a poly(aryl ether ketone) composition by a usually more cost-attractive polymer, in particular a poly(biphenyl ether sulfone), should not be an appropriate means to solve the complex problem of reducing the cost of the poly(aryl ether ketone) composition while substantially maintaining the chemical resistance conferred by the poly(aryl ether ketone).

THE INVENTION

A first aspect of the present invention is directed to the use of an effective amount ($\epsilon$) of a poly(biphenyl ether sulfone) (P2) for diluting a poly(aryl ether ketone) (P1) contained in a polymer composition (C1) consisting of the poly(aryl ether ketone) (P1) and, optionally in addition, one or more ingredients (A) other than the poly(aryl ether ketone) (P1) and the poly(biphenyl ether sulfone) (P2), while at least substantially maintaining the chemical resistance of the polymer composition (C1) in a chemical environment (E) which is more aggressive against the poly(biphenyl ether sulfone) (P2) than against the poly(aryl ether ketone) (P1).

Another aspect of the present invention is directed to a method for diluting a poly(aryl ether ketone) (P1) contained in a polymer composition (C1) while at least substantially maintaining the chemical resistance of the polymer composition (C1) in the need thereof, said polymer composition (C1) consisting of the poly(aryl ether ketone) (P1) and, optionally in addition, one or more ingredients (A) other than the poly(aryl ether ketone) (P1) and a poly(biphenyl ether sulfone) (P2), said chemical resistance of the polymer composition (C1) being at least substantially maintained in a chemical environment (E) which is more aggressive against the poly(biphenyl ether sulfone) (P2) than against the poly(aryl ether ketone) (P1), said method comprising diluting the poly(aryl ether ketone) (P1) by an effective amount ($\epsilon$) of the poly(biphenyl ether sulfone) (P2).

According the above two aspects, the polymer composition (C1) may be in the form of a shaped article or part of a shaped article (S1).

Let us denote (C2) the polymer composition which can be obtained after the dilution of the poly(aryl ether ketone) (P1), in contrast with (C1) which denotes the polymer composition before the dilution.

Then, still another aspect of the present invention is directed to a polymer composition (C2) consisting of:
  a poly(aryl ether ketone) (P1)
  an effective amount ($\epsilon$) of a poly(biphenyl ether sulfone) (P2), and
  optionally in addition, one or more ingredients (A) other than the poly(aryl ether ketone) (P1) and the poly(biphenyl ether sulfone) (P2), wherein the chemical resistance of said polymer composition (C2) in a chemical environment (E) which is more aggressive against the poly(biphenyl ether sulfone) (P2) than against the poly(aryl ether ketone) (P1), is at least substantially maintained, when compared to that of a polymer composition (C1) identical to the polymer composition (C2), except the poly (biphenyl ether sulfone) (P2) contained in the polymer composition (C2) has been completely replaced, weight pro weight, by the poly(aryl ether ketone) (P1).

Starting usually from a polymer composition (C1) consisting of 100 parts by weight (pbw.) of the poly(aryl ether ketone) (P1) and, optionally in addition, one or more ingredients (A) other than the poly(aryl ether ketone) (P1) and the poly(biphenyl ether sulfone) (P2), a polymer composition (C2) consisting of:
- a poly(aryl ether ketone) (P1), in an amount of (100-$\epsilon$) pbw, $\epsilon$ as defined below,
- an effective amount ($\epsilon$ pbw.) of a poly(biphenyl ether sulfone) (P2), and
- optionally in addition, one or more ingredients (A) other than the poly(aryl ether ketone) (P1) and the poly(biphenyl ether sulfone) (P2), can be prepared by a method comprising:
- providing the poly(biphenyl ether sulfone) (P2);
- providing the poly(aryl ether ketone) (P1);
- providing the ingredients (A), if any;
- contacting, preferably mixing, an effective amount, namely $\epsilon$ pbw., of the poly(biphenyl ether sulfone) (P2) with (100-$\epsilon$) pbw. of the poly(aryl ether ketone) (P1) and, the case being, the ingredients (A), so as to obtain the polymer composition (C2).

Still another aspect of the present invention is directed to a shaped article or to a part of a shaped article (S2) composed of the polymer composition (C2) as above described. A last aspect of the present invention is directed to an article assembly comprising said part.

DETAILED DESCRIPTION OF THE INVENTION

For the sake of clarity, the expression "for diluting a poly (aryl ether ketone) (P1) contained in a polymer composition (C1)" should herein be understood in its broad sense, namely: "for reducing the concentration of the poly(aryl ether ketone) (P1) contained in the polymer composition (C1)". Typically, such dilution can be achieved by replacing part of the poly (aryl ether ketone) (P1) by the poly(biphenyl ether sulfone) (P2). A frequent benefit resulting from the dilution of the "concentrated" polymer composition [namely, the polymer composition (C1)] is that the so-obtained "diluted" polymer composition [namely, the polymer composition (C2)] is more cost-attractive, because poly(biphenyl ether sulfone)(s) are usually not as expensive as poly(aryl ether ketone)s.

The polymer composition (C1) may have been prepared and its chemical resistance may have been assessed by a certain skilled person, before said skilled person uses the poly(biphenyl ether sulfone) (P2) for diluting the poly(aryl ether ketone) (P1) contained in the polymer composition (C1) in accordance with the presently invented use. This scenario is however not required at all: the presently invented use should be understood to be implemented as well, notably, as soon as a polymer concentration (C2) is conceived by a skilled person to the purpose of exhibiting in a certain environment (E) a chemical resistance at least substantially equal to the effectively measured or reasonably estimated chemical resistance of a poly(aryl ether ketone)-containing poly(biphenyl ether sulfone)-free polymer composition (C1), whatever the way this person has been made aware of the effectively measured or reasonably estimated chemical resistance of the polymer composition (C1), and the so-conceived polymer composition (C2) is then prepared on this basis.

The fact that, according to the present invention, the chemical resistance of the polymer composition (C1) is at least substantially maintained means usually that the polymer composition (C2) (the "diluted" polymer composition) has a chemical resistance in the environment (E), which is either lower than but close to that of polymer concentration (C1) (the "concentrated" polymer composition), or equal to that of polymer concentration (C1), or greater than that of polymer concentration (C1). Otherwise said, in environment (E), the polymer composition (C2) has not a chemical resistance substantially lower than that of polymer concentration (C1).

Preferably, in the present invention, the chemical resistance of the polymer composition (C1) is at least essentially maintained, i.e. the polymer composition (C2) has usually a chemical resistance in the environment (E) which is the same or essentially the same as that of polymer concentration (C1), or it is greater than that of polymer concentration (C1).

Any amount of poly(biphenyl ether sulfone) (P2) which, when used for diluting the poly(aryl ether ketone) (P1) contained in the polymer composition (C1), makes it possible to at least substantially maintain [i.e. does not substantially impair] the chemical resistance of the polymer composition (C1) in the environment (E) should be viewed as an effective amount ($\epsilon$), in the sense of the present invention.

As already explained, the effective amount ($\epsilon$) of the poly (biphenyl ether sulfone) (P2) can dilute the poly(aryl ether ketone) (P1) contained in the polymer composition (C1) in an amount of 100 parts by weight (pbw.), by replacing, in said polymer composition (C1), $\epsilon$ pbw. of the poly(aryl ether ketone) (P1) by $\epsilon$ pbw. of the poly(biphenyl ether sulfone) (P2); thereby, a polymer composition (C2) containing (100-$\epsilon$) pbw. of the poly(aryl ether ketone) (P1) and $\epsilon$ pbw. of the poly(biphenyl ether sulfone) (P2) can be obtained. When so defined, $\epsilon$ can range between 0 and 100 pbw.

From a theoretical point of view, $\epsilon$ can be as low as technically feasible, but amounts $\epsilon$ of poly(biphenyl ether sulfone) (P2), as defined in the previous paragraph, below than 1 pbw., are rarely desirable, because the so-achieved benefits of the dilution are in this case usually marginal. Thus, the effective amount ($\epsilon$) of the poly(biphenyl ether sulfone) (P2) is preferably above 2 pbw.; very preferably, it is above 5 pbw.

On the other hand, the effective amount ($\epsilon$) should usually not exceed a certain upper limit, which depends notably on the nature of the poly(biphenyl ether sulfone), the nature of the poly(aryl ether ketone), the nature and amount of optional ingredient(s) (A), and the nature of environment (E). Thus, the skilled in the art will often observe, that when replacing weight pro weight an increasing amount of the poly(aryl ether ketone) (P1) by the poly(biphenyl ether sulfone) (P2), the chemical resistance of the polymer composition (C1) is at least maintained or, at least substantially maintained [exhibiting a "plateau" or "quasi-plateau" behaviour], as long as the amount of the poly(biphenyl ether sulfone) (P2) does not exceed a critical limit, above which respectively the chemical resistance decreases substantially, sometimes in a sharp manner, to reach finally a level close to that of the poly(biphenyl ether sulfone) (P1) (see FIGS. 1 and 2, commented in the section "Examples" of the present specification); the overall chemical resistance curve [i.e. from 0 to 100 parts of the poly(aryl ether ketone) (P1) replaced, weight pro weight, by the poly(biphenyl ether sulfone) (P2)] looks sometimes like a sigmoid (see FIG. 3, also commented in the section "Examples"). Thus:

in certain embodiments of the present invention, the effective amount ($\epsilon$) of the poly(biphenyl ether sulfone) (P2), as previously defined, is preferably below 60 pbw.;

in certain other embodiments of the present invention, $\epsilon$ is preferably below 50 pbw.;

in still certain other embodiments, $\epsilon$ is preferably below 40 pbw.; in still certain other embodiments, $\epsilon$ is preferably below 35 pbw.; in still certain other embodiments, $\epsilon$ is preferably below 30 pbw.; in still certain other embodiments, $\epsilon$ is preferably below 25 pbw.; in still certain other embodiments, $\epsilon$ is preferably below 20 pbw.; in still certain other embodiments, $\epsilon$ is preferably below 15 pbw.

The skilled in the art will be easily able to determine the value of $\epsilon$ that is best convenient for his use, depending notably on all the above cited parameters.

In general, in the present invention, the polymer compositions (C1) and (C2) are susceptible of being temporarily or permanently in contact with the chemical environment (E); often, such temporary or permanent contact is effectively achieved.

Non limitative examples of chemical compounds (cE) susceptible of constituting or being part of the chemical environment (E) include: carboxylic acid esters, carboxylic acids, glycol ethers, aliphatic hydrocarbons, aromatic hydrocarbons such as benzene and toluene, monostyrene, phenols, epoxies, epoxy precursors such as propylene glycol monoether and ethylene glycol diglycidyl ether, ketones, chlorinated hydrocarbons and aqueous solutions of inorganic acids such as nitric acid and sulfuric acid.

Good results were obtained notably when the environment (E) contained a halogenated hydrocarbon, in particular a chlorinated hydrocarbon, such as carbon tetrachloride, chloroform and methylene chloride. The chlorinated hydrocarbon may contain from 1 to 12 carbon atoms.

Good results were also obtained when the environment (E) contained a ketone. The ketone may be a $C_3$-$C_{12}$ acyclic compound comprising at least one ketone group such as like methyl ethyl ketone and acetone; it may also be a homo- or heterocyclic compound (the cycle of which comprises preferably from 4 to 10 atoms, such as carbon or nitrogen atoms) comprising at least one ketone group, such as N-methylpyrrolidinone.

The weight of the chemical compound (cE), notably when (cE) is a halogenated hydrocarbon or a ketone, based on the total weight of the environment (E) may be higher than 10, 20, 50, 75 or 90%; in certain embodiments, the environment (E) may consist essentially of, or even consist of, the chemical compound (cE).

The chemical resistance of the polymer compositions (C1) and (C2) in the environment (E) can be assessed by any suitable parameter, and said parameter can itself be obtained by any suitable method. An example of such suitable parameter is the "retention ratio", namely the ratio of the value of a certain physical or chemical property of the polymer compositions (C1) and (C2) before they are contacted, temporarily or permanently, with the chemical environment (E), to the value of the same physical or chemical property of the polymer compositions (C1) and (C2) after they have been contacted with the same chemical environment (E).

The property of concern can be notably a mechanical property, such as the tensile strength, the tensile modulus, the flexural strength or the flexural modulus. The tensile properties can be determined notably according to ASTM method D-638, while the flexural properties can be determined notably according to ASTM method D-790.

In certain embodiments of the present invention, the polymer compositions (C1) and (C2) are not submitted to stress.

In certain other embodiments of the present invention, the polymer compositions (C1) and (C2) are submitted to stress; the case being, they may be submitted to stress either temporarily or permanently.

The Poly(Biphenyl Ether Sulfone) (P2)

For the purpose of the invention, a poly(biphenyl ether sulfone) is intended to denote a polycondensation polymer of which more than 50 wt. % of the recurring units are recurring units (R2) of one ore more formulae containing at least one p-biphenylene group:

at least one ether group (—O—) and at least one sulfone group (—SO$_2$—).

Preferably, recurring units (R2) are of one ore more formulae of the general type:

(1)

wherein $R_1$ through $R_4$ are —O—, —SO$_2$—, —S—, —C(═O)—, with the proviso that at least one of $R_1$ through $R_4$ is —SO$_2$— and at least one of $R_1$ through $R_4$ is —O—; $Ar_1$, $Ar_2$ and $Ar_3$ are arylene groups containing 6 to 24 carbon atoms, and are preferably phenylene or p-biphenylene; and a and b are either 0 or 1.

More preferably, recurring units (R2) are chosen from (2)

(3)

(4)

(5)

and (6)

Still more preferably, recurring units (R2) are:

(2)

For the purpose of the present invention, a polyphenylsulfone (PPSU) polymer is intended to denote any polymer of which more than 50 wt. % of the recurring units are recurring units (R2) of formula (2).

The poly(biphenyl ether sulfone) (P2) may be notably a homopolymer, a random, alternate or block copolymer. When the poly(biphenyl ether sulfone) (P2) is a copolymer, its recurring units may notably be composed of (i) recurring units (R2) of at least two different formulae chosen from formulae (2) to (6), or (ii) recurring units (R2) of one or more formulae (2) to (6) and recurring units (R2*), different from recurring units (R2), such as:

(7)

and (8)

-continued (9)

Preferably more than 70 wt. %, more preferably more than 85 wt. % of the recurring units of the poly(biphenyl ether sulfone) (P2) are recurring units (R2). Still more preferably, essentially all the recurring units of the poly(biphenyl ether sulfone) (P2) are recurring units (R2). Most preferably, all the recurring units of the poly(biphenyl ether sulfone) (P2) are recurring units (R2).

Excellent results were obtained when the poly(biphenyl ether sulfone) (P2) was a PPSU homopolymer, i.e. a polymer of which essentially all, if not all, the recurring units are of formula (2). RADEL® R polyphenylsulfone from Solvay Advanced Polymers, L.L.C. is an example of a PPSU homopolymer.

The poly(biphenyl ether sulfone) (P2) can be prepared by any method. Methods well known in the art are those described in U.S. Pat. Nos. 3,634,355; 4,008,203; 4,108,837 and 4,175,175, the whole content of which is herein incorporated by reference.

The Poly(Aryl Ether Ketone) (P1).

As previously mentioned, the polymer composition (C1) contains a poly(aryl ether ketone) (P1).

For the purpose of the present invention, the term "poly (aryl ether ketone)" is intended to denote any polymer of which more than 50 wt. % of the recurring units are recurring units (R1) of one ore more formulae containing at least one arylene group, at least one ether group (—O—) and at least one ketone group [—C(=O)—].

Preferably, recurring units (R1) are chosen from:

wherein:

Ar is independently a divalent aromatic radical selected from phenylene, biphenylene or naphthylene, X is independently O, C(=O) or a direct bond, n is an integer of from 0 to 3, b, c, d and e are 0 or 1, a is an integer of 1 to 4, and preferably, d is 0 when b is 1.

More preferably, recurring units (R1) are chosen from:

-continued

Still more preferably, recurring (R1) are chosen from:

(VI)

(VII)

and (VIII)

Most preferably, recurring units (R1) are:

(VII)

For the purpose of the present invention, a PEEK polymer is intended to denote any polymer of which more than 50 wt. % of the recurring units are recurring units (R1) of formula (VII).

The poly(aryl ether ketone) (P1) may be notably a homopolymer, a random, alternate or block copolymer. When the poly(aryl ether ketone) (P1) is a copolymer, it may notably contain (i) recurring units (R1) of at least two different formulae chosen form formulae (VI) to (XXI), or (ii) recurring units (R1) of one or more formulae (VI) to (XXI) and recurring units (R1*) different from recurring units (R1).

Preferably more than 70 wt. %, more preferably more than 85 wt. % of the recurring units of the poly(aryl ether ketone) (P1) are recurring units (R1). Still more preferably, essentially all the recurring units of the poly(aryl ether ketone) (P1) are recurring units (R1). Most preferably, all the recurring units of the poly(aryl ether ketone) (P1) are recurring units (R1).

Excellent results were obtained when the poly(aryl ether ketone) (P1) was a PEEK homopolymer, i.e. a polymer of which essentially all, if not all, the recurring units are of formula (VII).

The poly(aryl ether ketone) (P1) has a reduced viscosity (RV) of advantageously at least 0.55 dl/g and preferably of at least 0.70 dl/g; besides, the RV of the poly(aryl ether ketone) (P1) is advantageously of at most 1.10 dl/g and preferably of at most 0.90 dl/g. The reduced viscosity (RV) is measured in 95-98% sulfuric acid (d=1.84 g/ml) at a poly(aryl ether ketone) concentration of 1 g/100 ml. The measurement is performed using a No 50 Cannon-Fleske viscometer. RV is measured at 25° C. in a time less than 4 hours after dissolution, to limit sulfonation.

The poly(aryl ketone) (P1) can be prepared by any method. One well known in the art method comprises reacting a substantially equimolar mixture of at least one bisphenol and at least one dihalobenzoid compound or at least one halophenol compound as described in Canadian Pat. No. 847,963. Preferred bisphenols in such a process are hydroquinone, 4,4'-dihydroxybiphenyl and 4,4'-dihydroxybenzophenone; preferred dihalobenzoid compounds in such a process are 4,4'-difluorobenzophenone, 4,4'-dichlorobenzophenone and 4-chloro-4'-fluorobenzophenone; preferred halophenols compounds in such a process are 4-(4-chlorobenzoyl)phenol and (4-fluorobenzoyl)phenol. Accordingly, PEEK homopolymers may notably be produced by the nucleophilic process as described in, for example, U.S. Pat. No. 4,176,222, the whole content of which is herein incorporated by reference.

Another well known in the art method to produce PEEK homopolymers comprises electrophilically polymerizing phenoxyphenoxybenzoic acid or the like, using an alkane sulfonic acid as solvent and in the presence of a condensing agent, as the process described in U.S. Pat. No. 6,566,484, the whole content of which is herein incorporated by reference. Other poly(aryl ether ketone)s may be produced by the same method, starting from other monomers than phenoxyphenoxybenzoic acid, such as those described in U.S. Pat. Appl. 2003/0130476, the whole content of which is also herein incorporated by reference.

Optional Ingredients (A) of the Polymer Compositions (C1) and (C2)

The polymer compositions (C1) and (C2) may further contain conventional ingredients of poly(aryl ether ketone) compositions, including lubricating agents, heat stabilizers, antistatic agents, organic and/or inorganic pigments like $TiO_2$, carbon black, acid scavengers, such as MgO, stabilizers, i.e., metal oxides and sulphides such as zinc oxide and zinc sulphide, antioxidants, flame retardants, smoke-suppressing agents, and fillers, collectively referred to as ingredients (A).

If ingredients (A) are present, their weight, based on the total weight of the polymer composition (C1) [or based on the total weight of the polymer composition (C2)], is advantageously below 50%, preferably below 30 wt. %, more preferably below 10% and still more preferably below 5%. Excellent results were observed when the polymer compositions (C1) and (C2) were free of ingredients (A), i.e. they consisted of the poly(aryl ether ketone) (P1) and the poly(biphenyl ether sulfone) (P2).

The polymer compositions (C1) and (C2) are advantageously prepared by any conventional mixing method. A preferred method comprises dry mixing the ingredients of the polymer compositions of concern in powder or granular form, using e.g. a mechanical blender, then extruding the mixture into strands and chopping the strands into pellets.

Non limitative examples of shaped articles or part of shaped articles susceptible of being in accordance with the present invention include parts of aircraft passenger service units, air return grills in aircrafts, parts of aicraft heating systems, parts of aircraft ventilation systems, parts encapsulating a dry transformer or a motor coil, food service equipments, dental cases, medical instruments, plumbing fittings, fixtures, ball bearings and ball bearing retainer cages, pump bearings, needles, medical trays, coatings, wire and cable coatings, insulative films and thrustwashers.

Provided below are examples illustrative of the present invention, but not limitative thereof.

Examples

Five polymer compositions were prepared by blending PEEK with PPSU in various amounts, namely polymer compositions E1, E2, E3, E4 and E5. Polymer compositions composed of PEEK only on one hand, and PPSU only on the other hand, were also prepared as comparative examples, namely polymer compositions CE1 and CE2. The nature and amount of all the ingredients contained in the examplified polymer compositions are listed in table 1.

TABLE 1

| Samples formulation | | | | | | | |
|---|---|---|---|---|---|---|---|
| Ingredients | CE1 | E1 | E2 | E3 | E4 | E5 | CE2 |
| VICTREX ® 150P PEEK | 100 | 90 | 80 | 70 | 60 | 50 | 0 |
| RADEL R ® 5000 NT PPSU | 0 | 10 | 20 | 30 | 40 | 50 | 100 |

VICTREX ® 150P powdered PEEK resin was available from VICTREX Manufacturing Ltd. and RADEL ® R 5000 NT PPSU resin was available from SOLVAY ADVANCED POLYMERS, L.L.C.

Preparation of Specimens of the Polymer Compositions.

All polymer compositions were prepared by melt compounding the ingredients as listed in Table 1, using a Berstorff 25 mm twin screw extruder having eight barrel segments with seven heated zones and an overall length to diameter ratio of 33:1. The extruder was equipped with a vacuum vent at barrel 6 which was maintained under vacuum during all the compounding runs. The compositions were fed to the extruder by metering the ingredients into the feed throat of the extruder using gravimetric feeders which feed them at the appropriate rates to produce the desired blend ratio in each case. Detailed compounding conditions are shown in Table 2. The compounded resins were stranded into a water trough for cooling and solidification and was then diced into pellets.

TABLE 2

| Compounding Run Parameters Used for Compounding | | |
|---|---|---|
| | Set Points | |
| | For CE1, E1, E2, E3, E4 and E5 | For CE2 |
| Barrel 2 Temp. (° C.) | 330 | 315 |
| Barrel 3 Temp. (° C.) | 330 | 320 |
| Barrel 4 Temp. (° C.) | 340 | 350 |
| Barrel 5 Temp. (° C.) | 350 | 345 |
| Barrel 6 Temp. (° C.) | 350 | 345 |
| Barrel 7 Temp. (° C.) | 350 | 340 |
| Barrel 8 Temp. (° C.) | 350 | 345 |
| Die Adapter (° C.) | 360 | 345 |
| Die (° C.) | 360 | 345 |
| Melt Temperature (° C.) | 390-400 | 390-395 |
| Screw Speed (rpm) | 230 | 220 |

The pellets of each polymer composition (E1, E2, E3, E4, E5, CE1 and CE2) were then injection molded into ASTM 3.2 mm thick flexural bars using a 50 ton Sumitomo injection molding machine equipped with a 25 mm screw and having a 51 $cm^3$ shot capacity. Injection molding conditions were such that the resin melt temperature was maintained at 385-400° C. for all the samples and mold temperature was maintained at 170-180° C. All bars were then annealed at 200° C. for 1 hour prior to chemical resistance evaluations to ensure all parts were crystallized to the fullest extent possible.

Chemical Exposure Experiments.

The chemical resistance evaluation of the various compositions was conducted by measuring the flexural properties at room temperature (23° C.) on the as molded test bars, and on the same bars but following a 10-day and a 30 day immersion exposure in 3 different solvents, namely methyl ethyl ketone (MEK), chloroform and N-methylpyrrolidinone (NMP). All these are well known to be aggressive solvents toward many plastics. NMP and chloroform are so aggressive that they can actually dissolve PPSU; MEK, while being a weak solvent of PPSU, is still detrimental to its mechanical integrity.

The bars were simply dried with paper towels after removal from the chemical exposure baths and before conducting the flexural property measurements. The flexural property measurements before and after solvent exposure were all conducted according to ASTM method D-790.

Results

Polymer compositions testing results after immersion in MEK are shown in Table 3.

TABLE 3

Results of chemical resistance towards MEK

| MEK | Days Exposure | CE1 | E1 | E2 | E3 | E4 | E5 | CE2 |
|---|---|---|---|---|---|---|---|---|
| Flex Strength | 0 | 23400 | 21900 | 20400 | 19800 | 18900 | 18200 | 14300 |
| Flex Strength | 10 | 24000 | 20900 | 21200 | 19900 | 19500 | 18200 | — |
| Retention ratio | 10 | 1.03 | 0.95 | 1.04 | 1.01 | 1.03 | 1.00 | 0.00 |
| Flex Strength | 30 | 23600 | 22500 | 21200 | 20900 | 19700 | 18800 | — |
| Retention ratio | 30 | 1.01 | 1.03 | 1.04 | 1.06 | 1.04 | 1.03 | 0.00 |
| Flex Modulus | 0 | 584 | 537 | 497 | 479 | 454 | 433 | 337 |
| Flex Modulus | 10 | 595 | 506 | 516 | 481 | 475 | 436 | — |
| Retention ratio | 10 | 1.02 | 0.94 | 1.04 | 1.00 | 1.05 | 1.01 | 0.00 |
| Flex Modulus | 30 | 577 | 546 | 511 | 505 | 472 | 448 | — |
| Retention ratio | 30 | 0.99 | 1.02 | 1.03 | 1.05 | 1.04 | 1.03 | 0.00 |

The Radel® R sample (CE2) was partially dissolved and ruptured in MEK after only 10 days of immersion. On the other hand, likewise the neat PEEK sample (CE1), samples E1 to E5, which contained up to 50 pbw. of PPSU (PPSU/PEEK wt. ratio=1, example E5), maintained surprisingly the level of their flexural properties "as molded", even after a 30-day immersion, as evidenced by retention ratios of about 1.

Figure 1:
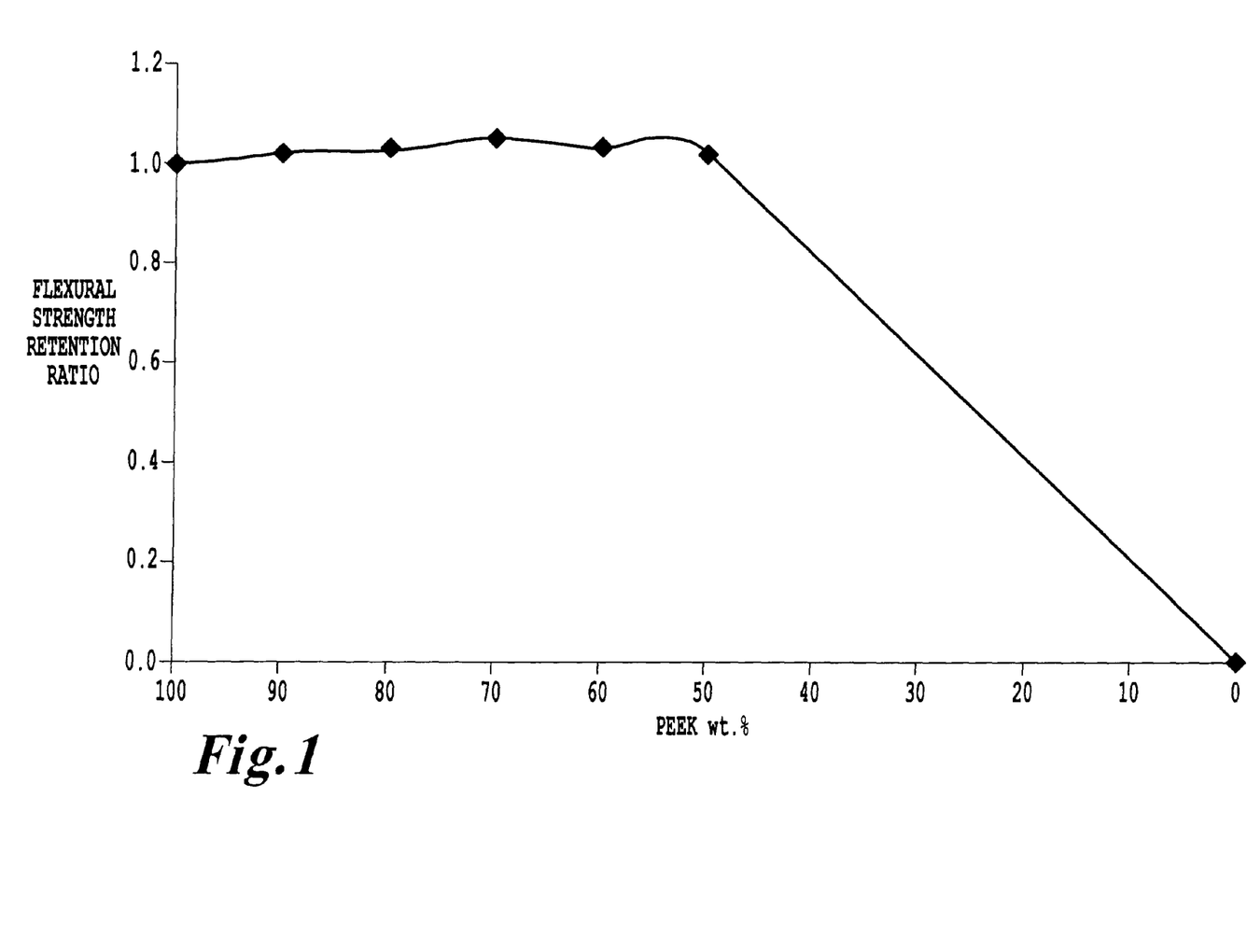
FIG. 1 shows a graphical representation of the flexural strength retention ratios of various compositions of a poly (biphenyl ether sulfone) (P2) and a poly(aryl ether ketone) (P1) after 30 days of exposure to methyl ethyl ketone (MEK).

FIG. 1 shows a graphical representation of the flexural strength retention ratios after 30 days of exposure to MEK. The flexural strength retention ratios were plotted versus the PEEK wt. % of the different polymer blends tested. In this case, the equivalence to PEEK in terms of retention of the flexural properties was unexpectedly achieved for PPSU/PEEK ratios at least as high as 50/50. Still more surprisingly, the Applicant has found that the retention ratio of certain blends even exceeded to some extent that of neat PEEK.

Polymer compositions testing results after immersion in chloroform are shown in table 4.

While the Radel® R sample (CE2) was completely dissolved in chloroform after only 10 days of immersion, samples E1 to E3 maintained surpringly the level of their flexural properties "as molded" even after a 30-day immersion.

Figure 2:
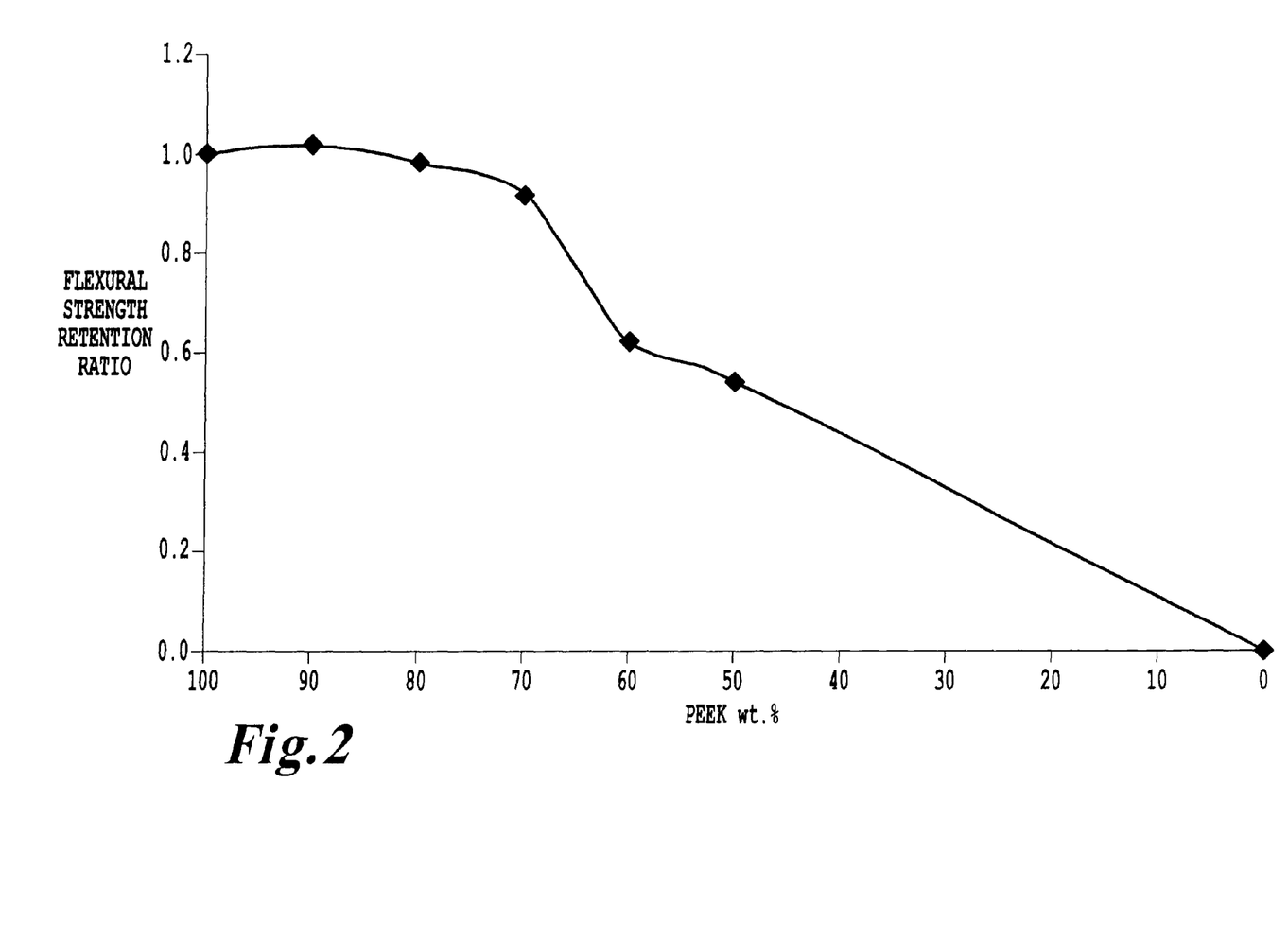
FIG. 2 shows a graphical representation of the flexural strength retention ratios of various compositions of a poly (biphenyl ether sulfone) (P2) and a poly(aryl ether ketone) (P1) after 30 days of exposure to chloroform.

FIG. 2 shows a graphical representation of the flexural strength retention ratios after 30 days of exposure to chloroform. The flexural strength retention ratios were plotted versus the PEEK wt. % of the different polymer blends tested. With chloroform as the chemical environment (E), the equivalence to PEEK in terms of retention of the flexural properties was unexpectedly achieved for PPSU/PEEK ratios as high as 30/70.

TABLE 4

Results of chemical resistance towards chloroform

| Chloroform | Days Exposure | CE1 | E1 | E2 | E3 | E4 | E5 | CE2 |
|---|---|---|---|---|---|---|---|---|
| Flex Strength | 0 | 23400 | 21900 | 20400 | 19800 | 18900 | 18200 | 14300 |
| Flex Strength | 10 | 22800 | 21200 | 19700 | 18600 | 13500 | 10100 | — |
| Retention ratio | 10 | 0.97 | 0.97 | 0.97 | 0.94 | 0.71 | 0.55 | 0.00 |
| Flex Strength | 30 | 23600 | 22500 | 20400 | 18400 | 11900 | 10000 | — |
| Retention ratio | 30 | 1.01 | 1.03 | 1.00 | 0.93 | 0.63 | 0.55 | 0.00 |
| Flex Modulus | 0 | 584 | 537 | 497 | 479 | 454 | 433 | 337 |
| Flex Modulus | 10 | 556 | 518 | 487 | 470 | 409 | 333 | — |
| Retention ratio | 10 | 0.95 | 0.96 | 0.98 | 0.98 | 0.90 | 0.77 | 0.00 |
| Flex Modulus | 30 | 572 | 549 | 509 | 483 | 414 | 369 | — |
| Retention ratio | 30 | 0.98 | 1.02 | 1.02 | 1.01 | 0.91 | 0.85 | 0.00 |

Polymer compositions testing results after immersion in NMP are shown in table 5.

TABLE 5

Results of chemical resistance towards NMP

| NMP | Days Exposure | CE1 | E1 | E2 | E3 | E4 | E5 | CE2 |
|---|---|---|---|---|---|---|---|---|
| Flex Strength | 0 | 23400 | 21900 | 20400 | 19800 | 18900 | 18200 | 14300 |
| Flex Strength | 10 | 22900 | 21700 | 20400 | 19500 | 10600 | 6100 | — |
| Retention ratio | 10 | 0.98 | 0.99 | 1.00 | 0.98 | 0.56 | 0.34 | 0.00 |

TABLE 5-continued

Results of chemical resistance towards NMP

| NMP | Days Exposure | CE1 | E1 | E2 | E3 | E4 | E5 | CE2 |
|---|---|---|---|---|---|---|---|---|
| Flex Strength | 30 | 24600 | 21800 | 20800 | 19500 | 7100 | 3800 | — |
| Retention ratio | 30 | 1.05 | 1.00 | 1.02 | 0.98 | 0.38 | 0.21 | 0.00 |
| Flex Modulus | 0 | 584 | 537 | 497 | 479 | 454 | 433 | 337 |
| Flex Modulus | 10 | 567 | 530 | 497 | 475 | 241 | 134 | — |
| Retention ratio | 10 | 0.97 | 0.99 | 1.00 | 0.99 | 0.53 | 0.31 | 0.00 |
| Flex Modulus | 30 | 573 | 529 | 499 | 471 | 169 | 80 | — |
| Retention ratio | 30 | 0.98 | 0.99 | 1.00 | 0.98 | 0.37 | 0.18 | 0.00 |

While the Radel® R sample (CE2) was completely dissolved in NMP after only 10 days of immersion, samples E1 to E3 maintained unexperctedly the level of their flexural properties even after a 30-day immersion.

Figure 3:
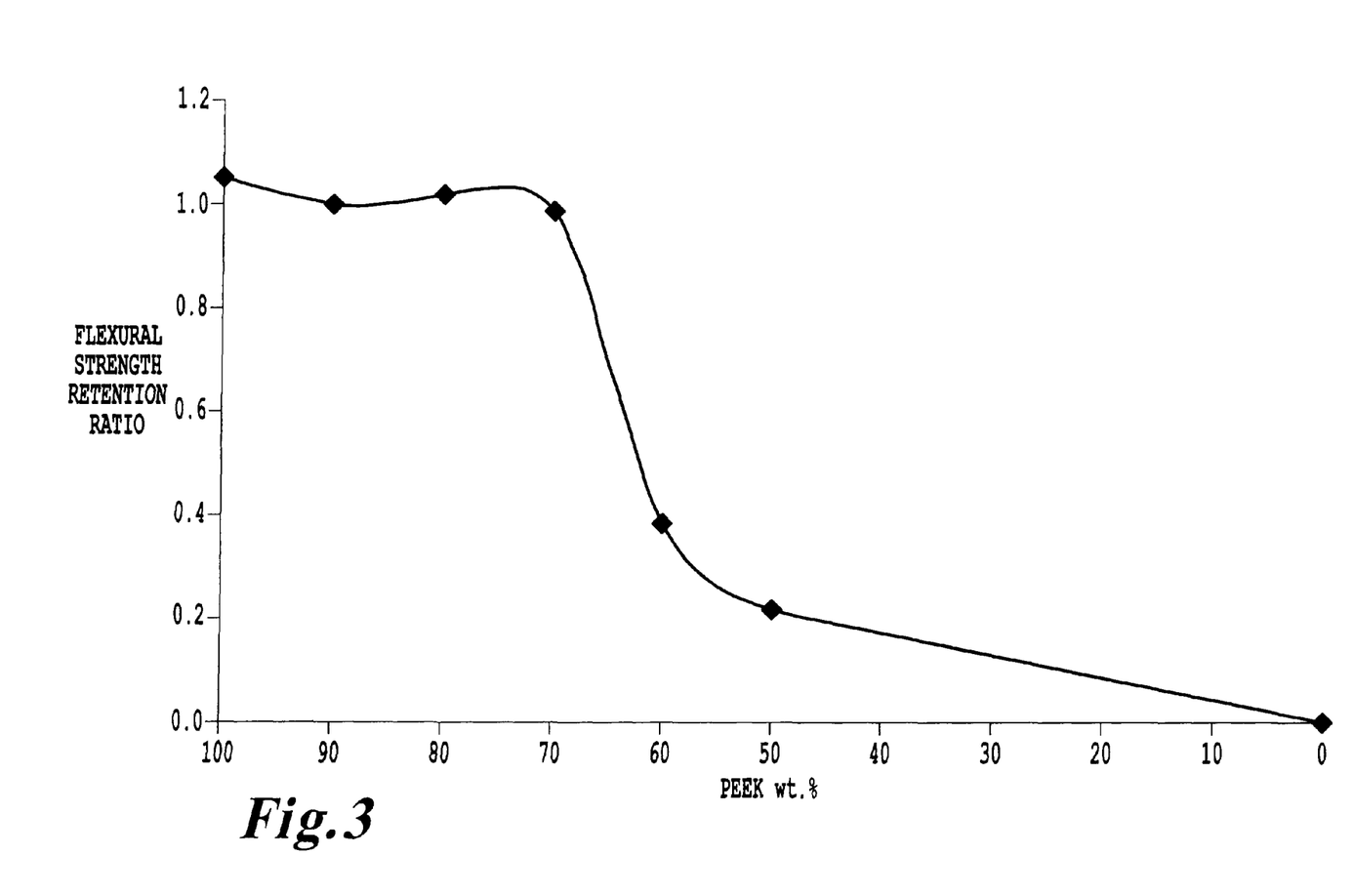
FIG. 3 shows a graphical representation of the flexural strength retention ratios of various compositions of a poly (biphenyl ether sulfone) (P2) and a poly(aryl ether ketone) (P1) after 30 days of exposure to N-methylpyrrolidinone (NMP).

FIG. 3 shows a graphical representation of the flexural strength retention ratios after 30 days of exposure to NMP. The flexural strength retention ratios were plotted versus the PEEK wt. % of the different polymer blends tested. With NMP as the chemical environment (E), the equivalence to PEEK in terms of retention of flexural properties was again unexpectedly achieved for PPSU/PEEK ratios as high as 30/70.

All these experimental data showed surprisingly that diluting PEEK with an effective amount of PPSU results in PEEK-PPSU blends having at least substantially the same chemical resistance as neat PEEK (while the test is performed in a chemical environment which is much more aggressive against PPSU than against PEEK), and is an attractive means of for reducing substantially the costs of the polymer material.

The invention claimed is:

1. A method to prepare a polymer composition, the composition comprising:
 a poly(aryl ether ketone); and
 a poly(biphenyl ether sulfone);
 wherein
 the poly(biphenyl ether sulfone) is a polymer of which more than 50 wt. % of the recurring units are recurring units of formula (2):

(2)

and an amount of the poly(biphenyl ether sulfone) in the polymer composition is greater than 2 parts by weight and less than 40 parts by weight based on 100 parts by weight of poly(biphenyl ether sulfone) and poly(aryl ether ketone);
 the method comprising:
 mixing the poly(aryl ether ketone) and the poly(biphenyl ether sulfone) in a proportion such that the content of the poly(biphenyl ether sulfone) in the polymer composition is greater than 2 parts by weight and less than 40 parts by weight based on 100 parts by weight of poly(biphenyl ether sulfone) and poly(aryl ether ketone); and, additionally, such that,
 at least one property selected from the group consisting of tensile strength, tensile modulus, flexural strength and flexural modulus retention ratio is essentially maintained equal to or exceeds that property of the poly(aryl ether ketone) in an undiluted state when the polymer composition is exposed to an aggressive chemical environment that is more aggressive against the poly(biphenyl ether sulfone) than it is against the poly(aryl ether ketone).

2. The method according to claim 1, wherein the amount of poly(biphenyl ether sulfone) in the polymer composition is above 5 parts by weight and below 40 parts by weight based on 100 parts by weight of poly(biphenyl ether sulfone) and poly(aryl ether ketone).

3. The method according to claim 1, wherein the amount of poly(biphenyl ether sulfone) in the polymer composition is above 2 parts by weight and below 30 parts by weight based on 100 parts by weight of poly(biphenyl ether sulfone) and poly(aryl ether ketone).

4. The method according to claim 1, wherein the amount of poly(biphenyl ether sulfone) in the polymer composition is between 5 and 25 parts by weight based on 100 parts by weight of poly(biphenyl ether sulfone) and poly(aryl ether ketone).

5. The method according to claim 1, wherein the flexural strength retention ratio of the polymer composition after exposure to the aggressive chemical environment is greater than the flexural strength retention ratio of the undiluted poly(aryl ether ketone) after exposure to the aggressive chemical environment.

6. The method according to claim 1, wherein the poly(biphenyl ether sulfone) is a polyphenylsulfone homopolymer essentially all the recurring units of which are of formula (2):

(2)

7. The method according to claim 1, wherein the poly(aryl ether ketone) is a polymer of which essentially all the recurring units are recurring units of one or more formulae containing at least one arylene group, at least one ether group (—O—) and at least one ketone group [—C(=O)—].

8. The method according to claim 1, wherein the poly(aryl ether ketone) is a polymer of which more than 50 wt. % of the recurring units are recurring units of formula (VII):

(VII)

9. The method according to claim 1, wherein the poly(aryl ether ketone) is a PEEK homopolymer essentially all the recurring units of which are of formula (VII):

(VII)

10. The method according to claim 1, wherein the aggressive chemical environment comprises at least one chemical compound selected from the group consisting of carboxylic acid esters, carboxylic acids, glycol ethers, aliphatic hydrocarbons, aromatic hydrocarbons, monostyrene, phenols, epoxies, epoxy precursors, ketones, chlorinated hydrocarbons, inorganic acids and mixtures thereof.

11. A shaped article or a part of shaped article comprising the polymer composition obtained by the method of claim 1.

12. The method according to claim 1, wherein said poly(aryl ether ketone) is a PEEK homopolymer essentially all the recurring units of which are of formula (VII):

(VII)

and said poly(biphenyl ether sulfone) is a polyphenylsulfone homopolymer essentially all the recurring units of which are of formula (2):

(2)

13. The method according to claim 12, wherein the tensile strength retention ratio of the polymer composition after said exposure to the aggressive chemical environment is the same as or greater than the tensile strength retention ratio of the undiluted PEEK homopolymer.

14. The method according to claim 12, wherein the amount of poly(biphenyl ether sulfone) in the polymer composition is above 2 parts by weight and below 30 parts by weight based on 100 parts by weight of poly(biphenyl ether sulfone) and poly(aryl ether ketone), and
wherein the aggressive chemical environment comprises at least one chemical compound selected from the group consisting of carboxylic acid esters, carboxylic acids, glycol ethers, aliphatic hydrocarbons, aromatic hydrocarbons, monostyrene, phenols, epoxies, epoxy precursors, ketones, chlorinated hydrocarbons, inorganic acids and mixtures thereof.

15. The method according to claim 14, wherein the polymer composition further comprises at least one component selected from the group consisting of lubricating agents, heat stabilizers, anti-static agents, organic pigments, inorganic pigments, acid scavengers, stabilizers, metal oxides, metal sulphides, antioxidants, flame retardants, smoke-suppressing agents, and fillers.

16. The method according to claim 1, wherein the tensile modulus retention ratio of the polymer composition after said exposure to the aggressive chemical environment is the same as or greater than the tensile modulus retention ratio of the undiluted PEEK homopolymer.

17. The method according to claim 1, wherein the flexural strength retention ratio of the polymer composition after exposure to the aggressive chemical environment is the same as or greater than the flexural strength retention ratio of the undiluted PEEK homopolymer.

18. The method according to claim 1, wherein the flexural modulus retention ratio of the polymer composition after said exposure to the aggressive chemical environment is the same as or greater than the flexural modulus retention ratio of the undiluted PEEK homopolymer.

19. The method according to claim 1, wherein the amount of poly(biphenyl ether sulfone) is above 5 parts by weight and below 30 parts by weight based on 100 parts by weight of poly(biphenyl ether sulfone) and poly(aryl ether ketone).

20. The method according to claim 1, wherein the polymer composition further comprises a component selected from the group consisting of lubricating agents, heat stabilizers, anti-static agents, organic pigments, inorganic pigments, acid scavengers, stabilizers, metal oxides, metal sulphides, antioxidants, flame retardants, smoke-suppressing agents, and fillers.

21. The method according to claim 1, wherein the polymer composition consists of the poly(biphenyl ether sulfone) and the poly(aryl ether ketone).

22. The method of claim 1, wherein the mixing comprises dry mixing of the poly(biphenyl ether sulfone), poly(aryl ether ketone) and further components to obtain a polymer composition blend and the method further comprises extrusion of the polymer composition blend.

* * * * *